Figure 1:
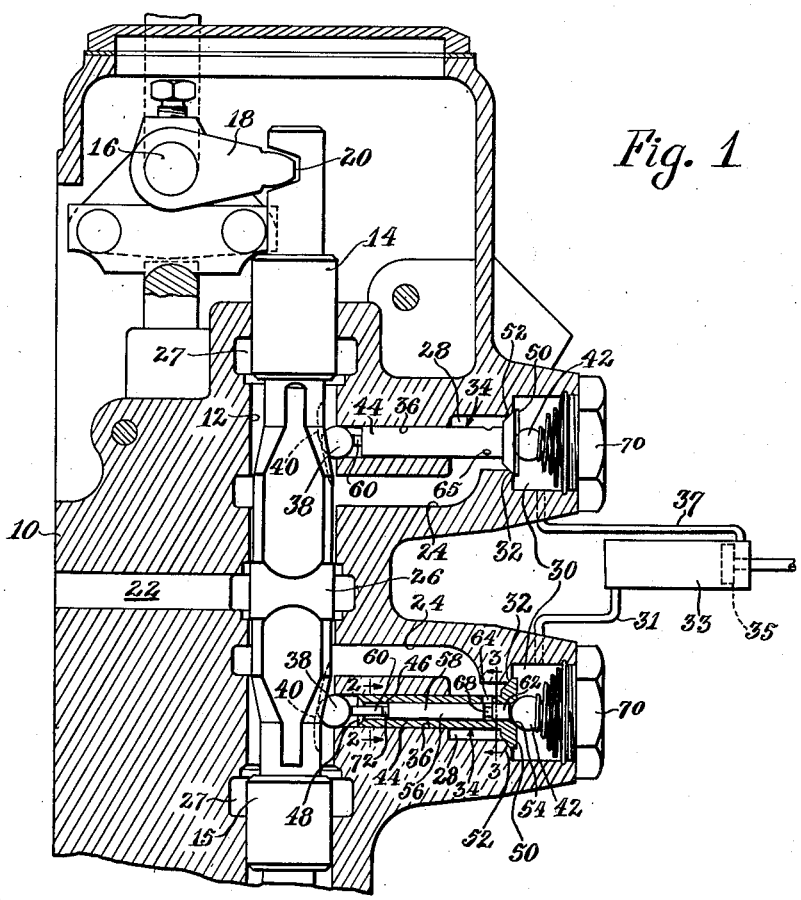

Sept. 30, 1952     W. H. WORTHINGTON     2,612,375
DUAL CHECK VALVE ASSEMBLY FOR HYDRAULIC CONTROL SYSTEMS
Filed April 19, 1950

INVENTOR.
W. H. Worthington
BY
Attorneys

Patented Sept. 30, 1952

2,612,375

UNITED STATES PATENT OFFICE 2,612,375

DUAL CHECK VALVE ASSEMBLY FOR HYDRAULIC CONTROL SYSTEMS

Wayne H. Worthington, Waterloo, Iowa, assignor to Deere Manufacturing Co., Dubuque, Iowa, a corporation of Iowa Original application March 31, 1948, Serial No. 18,198, now Patent No. 2,579,134, dated December 18, 1951. Divided and this application April 19, 1950, Serial No. 156,810. In Canada January 28, 1949

5 Claims. (Cl. 277—20)

This application is a division of co-pending application, Serial No. 18,198, filed March 31, 1948, now Patent No. 2,579,134, dated December 18, 1951.

This invention relates to a hydraulic control system and more particularly to a dual check valve assembly for use in such system.

The primary purpose of the invention is to provide improvements in a dual check valve of the general class referred to to the end that desirable refinements in control are available when selectively operating the hydraulic system at either high or low speeds. A typical example of such hydraulic system is that used as the source of power on an agricultural tractor for adjusting implements drawn by or mounted on the tractor. In the instances of a plow, cultivator or planter, there are conditions in which it is desirable merely to raise or lower the implement with respect to the ground. Under such conditions, the hydraulic system may be operated at full speed. Under other conditions, however, it may be desirable to effect a rather fine adjustment, and it is therefore necessary that the operator have the system well under control. Of course, the slow-speed control for fine adjustments could be accomplished by manually moving the control valve to a partially opened position, but it will be seen that such partially opened position is not accurately defined and could easily be disturbed so that the tool would have to be readjusted. According to the present invention, there is provided a dual check valve assembly comprising a pair of relatively movable parts, the smaller of which is initially opened to permit slow-speed operation and the larger of which is subsequently opened simultaneously with further opening of the smaller part to provide for full-speed operation, it being understood that relative movement of the smaller and larger parts provides for throttled fluid flow.

A further improvement provided by the present invention resides in the provision of selectively cooperative passage means in the smaller and larger parts so that different ranges of fluid-restricting characteristics can be obtained without affecting the operational characteristics of the assembly. In brief, the check valve comprises a larger outer part having an axial bore therethrough in which is slidably carried an inner part adapted to be initially engaged by a valve-actuating member. The outer part has fluid passage means and the inner part has fluid passage means at each of its opposite ends. The inner part is reversible or interchangeable end for end and the passage means at one end cooperates with the passage means in the outer part in a manner different from the cooperation between the passage in the outer part and the passage at the other end of the inner part. At the same time, the reversibility of the inner part does not affect the operational characteristics thereof with respect to the valve operating member, so that in either position, the check valve functions identically except for different fluid-restricting characteristics through the selectively differently cooperating fluid passage means.

Another object of the invention is to provide an improved check valve assembly that may be easily and economically constructed and one that may be readily provided for installation in hydraulic control systems of certain known types.

Figures 2, 3:
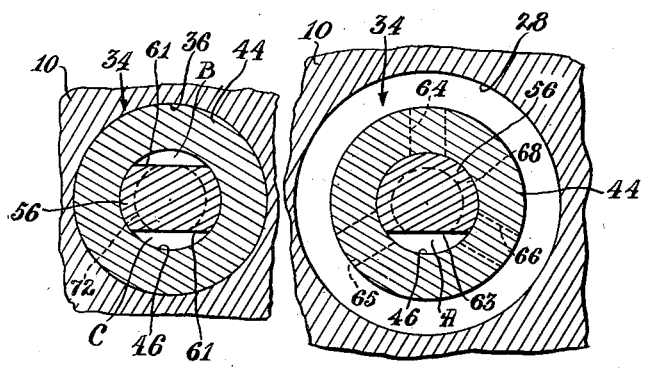

The foregoing and other important objects and desirable features inherent in and encompassed by the invention will become apparent as a complete disclosure of a preferred embodiment of the invention is made in the following detailed description and accompanying sheet of drawings in which Figure 1 is a fragmentary sectional view of a power control casing or housing embodying the improved check valve assembly;

Figure 2 is a transverse sectional view, on an enlarged scale, taken substantially on the line 2—2 of Figure 1; and Figure 3 is an enlarged sectional view taken on the line 3—3 of Figure 1.

The hydraulic power control system chosen for the purposes of illustration is merely typical of many other forms that it could assume. Likewise, the dual character of the check valve assembly per se, apart from the selective throttling means, may take any form other than that illustrated, since the basic concept of a dual check valve is old as disclosed in U. S. Patent No. 1,215,146.

That portion of the hydraulic system illustrated in Figure 1 represents a control or valve casing 10 provided with a main control valve bore 12 in which is carried for reciprocation a main control valve 14. A rockshaft 16 is provided with an arm 18 which is connected at 20 to the upper end of the control valve 14. A high-pressure passage 22 communicates with the valve bore 12 intermediate its ends and is normally cut off from upper and lower fluid passages 24 by means of an annular enlarged section 26 of the main valve 14. Exhaust ports 27 are provided at opposite ends of the main valve bore 12.

Since the valve casing and passages therein are symmetrical at both sides of the high-pressure passage 22, only one portion thereof will be described, it being understood that, for all practical purposes, what is said about one-half of the casing is applicable to the other half.

The passage 24 communicates through a port 28 separated from an adjoining chamber 30 by a valve seat 32 and a dual check valve assembly designated generally by the numeral 34.

A bore 36 coaxial with the port 28 and valve seat 32 serves to carry the check valve assembly for axial shifting to control the valve seat 32 and port 28. A control ball 38 at the inner end of the check valve assembly cooperates with the check valve assembly and with a ramp 40 on the control valve 14 to effect shifting of the check valve assembly to the right against a spring-loaded second ball 42.

In general, the operation is as follows: It will be assumed that the main control valve 14 is in neutral position as shown. When the rockshaft 16 is moved in a counterclockwise direction to move the valve 14 upwardly, the upper ramp 40 on the main valve forces the upper ball 38 against the left-hand end of the upper check valve 34 and opens the check valve to communicate the upper chamber 30 and the exhaust port 27 via the valve bore 12, the upper passage 24 and the port 28. It will be seen that opening of the upper check valve 34 is in direct proportion to the amount of upward movement of the control valve 14. When the control valve 14 is returned to its illustrated position, the check valve is caused to seat by means of the spring-loaded ball 42. When the upper check valve 34 is opened by upward movement of the main control valve 14, the lower portion of the valve bore 12 is connected to the high-pressure passage 22 because of upward movement of the central enlarged portion 26 on the valve 14, and the lower exhaust port is cut off by a valve port 15. Hence, the lower check valve 34 is opened by fluid pressure. The lower chamber 30 is connected by a fluid line 31 to one end of a motor cylinder 33 in which a piston 35 is carried. The other end of the cylinder 33 is connected by a line 37 to the upper chamber 30.

The details of the check valve assembly 34 will be clear from the sectional illustration of the lower check valve in Figure 1 and from the enlarged sectional view in Figures 2 and 3. The check valve assembly includes an outer valve part 44 having inner and outer ends and provided with an axial bore 46, preferably cylindrical, communicating the opposite ends of the valve part. The inner end of the valve part is interiorly chamfered at 48 and lies proximate to the inner valve-actuating member comprising the ball 38. The outer end of the valve part 44 is enlarged to provide a head 50 which is exteriorly formed with a poppet or conical seating surface 52 and which is interiorly formed with a conical valve seat 54. The valve surface 52 cooperates with the valve seat 32 to control the port 28 between the passage 24 and the chamber 30. The interior seat 54 provides a seat for the spring-loaded ball 42. Since the interior seat 54 communicates with the outer end of the bore 46, the ball 42 and the seat 54 cooperate to control communication between the outer end of the bore 46 and the chamber 30. The action of the spring on the ball 42 serves to normally close the opening provided by the seats 32 and 54.

Each valve assembly 34 further includes an inner part 56 in the form of an elongated combined metering and control rod having an intermediate cylindrical portion 58 and opposite reduced end portions 60 and 62. The cylindrical portion 58 carries the inner part 56 in the outer part for axial shifting in the bore 46; but the bore 46 and portion 58 are comparably cylindrical to the extent that the fit therebetween is sufficiently close to substantially seal the bore against the transmission of fluid between its inner and outer ends. The portions 60 and 62 are of differently reduced cross-sectional area as respects the diameter of the bore 46. The reduction in the portion 60 is accomplished by a configuration including a pair of opposite parallel flats 61 (Figure 2). A reduction at the portion 62 is accomplished by the provision of a single flat 63 (Figure 3).

The reduction in cross-section of the portions 60 and 62 as respects the cross-sectional area of the bore 46 provides what may be termed first and second fluid-passage means respectively at opposite ends of the inner valve part 56. As will be explained below, these passage means are selectively cooperative with passage means comprising a plurality of radially disposed orifices 64, 65 and 66 provided in the outer valve part 44 adjacent its headed end. These orifices effect fluid-transmitting communication between the interior of the bore 46 at the head end of the check valve and that portion of the exterior of the outer part 44 that opens to the passage 24, it being noted that the port 28 surrounds that portion of the check valve in which the orifices are formed.

When the combined control and metering rod 56 is in the position shown in the lower portion of Figure 1, the inner end portion 60 is proximate to the valve-actuating ball 38 and the outer end portion 62 is engaged by the spring-loaded ball 42, the spring serving to hold the entire assembly in closed position. In addition, the portion 62 of the inner part 56 cooperates with certain of the orifices 64, 65 and 66 to provide restricted fluid communication between the exterior and the interior of the check valve, the head end of the valve still being closed by the ball 42.

The right-hand end (Figure 1) of the inner check valve part 56 is provided with an annular groove 68 that separates the cylindrical portion 58 from the end portion 62. When the inner part 56 is in the position shown in Figure 3, the annular groove 68 communicates all three orifices 64, 65 and 66 with the space provided by the flats 63 and associated portion of the bore 46. In short, the fluid passage between the port 28 and the right-hand end of the check valve is determined by the cross-sectional area of the space designated by the letter A in Figure 3.

The left-hand end portion 60 projects axially slightly beyond the left-hand end of the bore 46 and thus engages the valve-actuating ball 38, the ball-receiving chamfer at the left end or inner end of the part 44 being in axially spaced relation to the ball 38, whereby downward shifting of the main control valve 14 effects initial shifting of the lower control and metering rod 56 prior to shifting of the outer valve part 44. When the main control valve member 14 is moved downwardly sufficiently to shift the control and metering rod 56 but not the outer valve part 44, the outer ball 42 is unseated from the seat 54 by means of the outer or right-hand end portion 62 of the rod. Fluid pressure in the lower chamber 30 maintains the seated relation between the outer part 44 and the valve seat 32 and a limited amount of fluid, determined by the space or passage A, may flow into the passage 24 from the chamber 30 via the cracked check valve. The primary function of cracking the check valve to this extent is to regulate the flow of fluid through the check valve by means of the inner valve part comprising the control and metering rod 56. Hence, in those cases in which it becomes necessary to open the check valve assembly 34 against the pressure of fluid in the chamber 30, the opening is made easier by first unseating the ball 42 and then unseating the outer part. This result will follow from initial engagement by the ball 38 unseating the outer part. This result will follow from initial engagement by the ball 38 with the control and metering rod and subsequent engagement with the inner end of the outer part 44. In a two-way system, which will be equipped with two check valve assemblies similar to the assembly 34, the transmission of fluid at high pressure but at a reduced rate will be obtainable by throttling the return fluid through the restriction provided by the cooperating passage means just described.

It will be noted that maximum opening of the ball 42 as effected by the combined control and metering rod is effected by that amount of movement of the control and metering rod necessary merely to unseat the ball without closing the orifice 66, at the same time maintaining the closure on the unused orifice 64. At the end of movement of the control and metering rod, the ball 38 picks up the outer part and both the inner and outer parts move simultaneously, the relative positions between the inner and outer parts not changing during subsequent movement.

It is often desired to utilize a particular hydraulic control system in situations in which the fluid-flow characteristics are somewhat different. Hence, it is feasible to provide means for adapting the system to the changed condition. It is, of course, expedient that such means be simple and inexpensive and that it have capacity for use without materially altering the main components of the system. Such an arrangement is provided according to the present invention, since all that is necessary is reversing of the control and metering rod end for end so as to obtain cooperative fluid passage means providing different fluid-flow characteristics.

In the particular embodiment illustrated, the outer end of the chamber 30 is closed by a threaded plug 70 which serves also as a seat for the end of the spring for the ball 42. After the plug 70 is removed, the spring and ball 42 may be removed, followed by removal of the check valve assembly 34. The control and metering rod 56 may be changed end for end and the components reassembled, resulting in disposition of the control and metering rod 56 with its end portion 62 adjacent the ball 38 and its end portion 60 adjacent the ball 42.

The end portion 60, including the two flats 61, is separated from the cylindrical portion 58 of the valve by an annular groove 72 (Figure 2). Hence, when the end portion 60 is arranged for cooperation with the orifices 64, 65 and 66, the annular groove 72, in conjunction with the flats 61, establishes communication between the interior and exterior of the check valve assembly, the flats providing the two spaces designated at B and C in Figure 2. It will be seen that the combined cross-sectional area of the spaces B and C is greater than the cross-sectional area of the space provided at A (Figure 3). Therefore, the fluid-flow characteristics of the check valve are different from those obtained when the inner part 56 is in the position shown in Figure 1.

Even though the control and metering rod may be changed end for end and the components reassembled to obtain selectively different fluid-flow characteristics, the operational characteristics of the rod as a control member will not be changed, because, in either position of the rod, whichever end is innermost and adjacent the control ball 38 has the same extent of axial projection as the other.

The instant disclosure is based upon a preferred embodiment of the invention. However, it will be appreciated that numerous modifications and alterations may be made in the invention without departing from the spirit and scope thereof as defined in the appended claims.

What is claimed is:

1. For use in a valve casing having a valve port including an outer portion provided with a valve seat and an inner portion opening to a valve-actuating member: a dual valve, comprising, an outer part formed externally to be shiftably carried in the valve port and having opposite inner and outer ends and provided with a through bore communicating said ends; means at the outer end of said part including a valve head cooperative to seat on and be unseated from the port seat, and means at the inner end of said part engageable by the valve-actuating member to effect shifting of said part for causing unseating of said valve head; an inner valve part having opposite ends and constructed for reversibility end for end to occupy selectively either of two adjusted operating positions relative to the outer part and so dimensioned intermediate its said ends as to axially slidably fit the bore in substantially fluid-sealing relationship in either of said positions; said inner part in either position having one of its ends projecting axially beyond the inner end of the bore so as to be initially engageable by the valve-actuating member for axial shifting prior to engagement by said member of the inner end of the outer part, said inner part in either position having its valve-actuating-member-proximate end identically arranged relative to said valve-actuating member; fluid passage means generally radially of the outer part and spaced inwardly of the valve head to communicate the bore and the exterior of said outer part; first and second fluid control portions respectively at and opening generally axially to the opposite ends of the inner part and selectively communicable with the outer part passage means according to the selected adjusted position of said inner part; and said fluid-control portions being differently constructed so that the fluid-flow relationship between the outer part passage means and the first fluid-control portion in one adjusted position of the inner part differs from the fluid-flow relationship between said outer part passage means and the second fluid-control portion in the reversed position of the inner part.

2. For use in a valve casing having a valve port including an outer portion provided with a valve seat and an inner portion opening to a valve-actuating member: a dual valve, comprising, an outer part formed externally to be shiftably carried in the valve port and having opposite inner and outer ends and provided with a through bore communicating said ends; means at the outer end of said part including a valve head cooperative to seat on and be unseated from the port seat, and means at the inner end of said part engageable by the valve-actuating member to effect shifting of said part for causing unseating of said valve head; an inner valve part having opposite ends and constructed for reversibility end for end to occupy selectively either of two adjusted operating positions relative to the outer part and so dimensioned intermediate its said ends as to axially slidably fit the bore in substantially fluid-sealing relationship in either of said positions; said inner part in either position having one of its ends projecting axially beyond the inner end of the bore so as to be initially engageable by the valve-actuating member for axial shifting prior to engagement by said member of the inner end of the outer part, said inner part in either position having its valve-actuating-member-proximate end identically arranged relative to said valve-actuating member; said outer part having generally radial orifice means communicating through the outer part to the bore therein axially inwardly of the valve head; means in the inner part providing first and second axially separated first and second fluid control portions respectively at and opening generally axially to the opposite ends of the inner part and selectively communicable with said orifice means in the respective adjusted positions of said inner part; and said first and second fluid control portions being differently formed and dimensioned to have different fluid-flow-restricting effects on the orifice means so as to provide for selectively different fluid-flow characteristics in cooperation with said orifice means according to the selected adjusted position of said inner part.

3. The invention defined in claim 2, further characterized in that: said first and second fluid control portions on the inner part are respectively in the form of inner part end portions of differently reduced cross-section as respects the bore.

4. The invention defined in claim 3, further characterized in that: said first fluid control portion is in the form of a reduction in cross-section of one end of the inner part at one side thereof; said second fluid control portion is in the form of a reduction in cross-section of the other end of the inner part from two sides thereof; and passage means generally transverse to the shifting axis of the inner part joins said two sides of said second reduction so that both sides of said second reduction are communicable with the orifice means in the outer part.

5. The invention defined in claim 3, further characterized in that: the bore is cylindrical and the inner part intermediate its ends is a comparable cylinder; the first fluid-control portion is in the form of a flat on a chord of the inner part cylinder at one end so as to effect a reduction in the cross-section of one end of the inner part; the second fluid-control portion is in the form of a pair of flats on two circumferentially spaced chords of the inner part cylinder so as to effect a greater reduction in the cross-section of the other end of the inner part; and circumferential passage means joins the flats of said pair.

WAYNE H. WORTHINGTON.

REFERENCES CITED

The following references are of record in the file of this patent:

UNITED STATES PATENTS

| Number | Name | Date |
|---|---|---|
| 1,215,146 | Haeseler | Feb. 6, 1917 |
| 2,355,692 | Allen | Aug. 15, 1944 |
| 2,483,312 | Clay | Sept. 27, 1949 |